United States Patent
Wang et al.

(10) Patent No.: US 11,879,817 B2
(45) Date of Patent: Jan. 23, 2024

(54) GROUND TESTING DEVICE FOR STABILIZED PLATFORM OF ROTARY STEERABLE DRILLING TOOL

(71) Applicant: CHINA UNIVERSITY OF PETROLEUM, QingDao (CN)

(72) Inventors: Weiliang Wang, QingDao (CN); Yanfeng Geng, QingDao (CN); Li Sheng, QingDao (CN); Jinming Tian, QingDao (CN); Minglei Li, QingDao (CN)

(73) Assignee: CHINA UNIVERSITY OF PETROLEUM, Qingdao (CN)

( * ) Notice: Subject to any disclaimer, the term of this patent is extended or adjusted under 35 U.S.C. 154(b) by 0 days.

(21) Appl. No.: 18/242,684

(22) Filed: Sep. 6, 2023

(65) Prior Publication Data
US 2023/0408368 A1 Dec. 21, 2023

(30) Foreign Application Priority Data

Apr. 26, 2023 (CN) .......................... 202310456921.8

(51) Int. Cl.
G01M 7/02 (2006.01)
G01M 7/04 (2006.01)
E21B 7/04 (2006.01)

(52) U.S. Cl.
CPC ............ G01M 7/025 (2013.01); G01M 7/022 (2013.01); G01M 7/045 (2013.01); E21B 7/04 (2013.01)

(58) Field of Classification Search
CPC ...... G01M 7/025; G01M 7/022; G01M 7/045; E21B 7/04
USPC ............................................ 73/660
See application file for complete search history.

(56) References Cited

FOREIGN PATENT DOCUMENTS

| CN | 203230341 U | * | 10/2013 |
| CN | 116591627 A | * | 8/2023 |
| JP | 2000319865 A | * | 11/2000 |

\* cited by examiner

Primary Examiner — Lisa M Caputo
Assistant Examiner — Rose M Miller
(74) Attorney, Agent, or Firm — IPRO, PLLC

(57) ABSTRACT

The present invention belongs to the technical field of oil field drilling, and relates to a ground testing device for a stabilized platform of a rotary steerable drilling tool. The ground testing device includes: a first supporting member and a second supporting member that are oppositely arranged, where the second supporting member is provided with a first mounting hole; a drill collar and a drill collar motor mounted outside the first supporting member, where a motor shaft of the drill collar motor penetrates the first supporting member and is connected to the drill collar, and a stabilized platform mounting assembly is arranged inside the drill collar; and a first vibration member connected to the drill collar and a second vibration member arranged in the first mounting hole in a sleeved manner, where an elastic member is arranged between the second vibration member and the second supporting member, and the elastic member is arranged on the second vibration member in a sleeving manner. An end portion of the first vibration member is provided with first vibration teeth, an end portion of the second vibration member is provided with second vibration teeth matching the first vibration teeth, and the second vibration member is provided with a first stop member which matches a second stop member arranged in the first mounting hole. According to the present invention, vibration, interference loading, and high-temperature simulation can be performed, and ground tests of different types of mechanical stabilized platforms are achieved.

9 Claims, 6 Drawing Sheets

GROUND TESTING DEVICE FOR STABILIZED PLATFORM OF ROTARY STEERABLE DRILLING TOOL

TECHNICAL FIELD

The present invention belongs to the technical field of oil field drilling, and relates to a ground testing technology for a stabilized platform of a drilling tool, in particular to a ground testing device for a stabilized platform of a rotary steerable drilling tool.

BACKGROUND ART

The complexity of the occurrence of geological resources and oil and gas determines the necessity of steerable drilling technology. Only by means of design and drilling of various complex well structures, can oil and gas resources be efficiently developed. As a closed-loop steerable drilling tool, a rotary steerable tool completes a steerable function in real-time during rotary drilling of a drill string. Thanks to an advanced measurement-while-drilling system and a downhole control system that are equipped with a rotary steerable system, the rotary steerable drilling system can automatically adjust a direction of a drill bit or steerable force near the drill bit, such that a direction of a wellbore trajectory. The drilling system greatly improves the construction efficiency of the complex wellbore trajectory and has important research and development value.

A stabilized platform is a reference space for the rotary steerable drilling tool to measure and control the direction of the drill bit. The dynamic response performance and disturbance rejection performance of the stabilized platform directly determine the steerable accuracy and reliability of the rotary steerable tool. Different ways of implementing the stabilized platform bring up different technical characteristics of the rotary steerable drilling tool, and even determine performance indexes and the overall size of the tool. Generally, the stabilized platform can be a physical platform or a virtual one, which corresponds to two types of implementation methods of the stabilized platform of the rotary steerable drilling tool. One type is a strap-down stabilized platform, and the other type is a mechanical stabilized platform, where the mechanical stabilized platform is further divided into a single-motor stabilized platform and a double-turbine generator stabilized platform. For the strap-down stabilized platform, an independent mechanical structure of the stabilized platform does not need to be designed, but a complex algorithm is needed for cooperation to obtain an accurate drilling tool attitude, and a large amount of computation is required. In contrast, the mechanical stabilized platform has an independent mechanical structure. It has better measurement accuracy. However, it is necessary for the mechanical stabilized platform to work in a high-temperature and high-vibration environment for a long time, and there is no apparatus capable of simulating the working environment in the prior art. If the stabilized platform is directly placed on the drilling tool for testing, not only a large amount of materials and financial resources are consumed, but also a detailed working state of the stabilized platform cannot be obtained. Therefore, it is necessary to develop a special ground testing apparatus for a stabilized platform.

The mechanical stabilized platform is further divided into the single-motor stabilized platform and the double-turbine generator stabilized platform, where the double-turbine generator stabilized platform is a single-axis stabilized platform with independent power generation capacity. Each end of a rotating shaft of the double-turbine generator stabilized platform is provided with a turbine generator (called an upper turbine generator and a lower turbine generator respectively), and the torque of the stabilized platform is balanced by adjusting the electromagnetic torque of the upper turbine generator and the lower turbine generator, such that the stabilized platform is geostationary. For the double-turbine generator stabilized platform, only with the assistance of hydraulic circulation, can the turbine generators be driven to work normally. However, the torque of the hydraulic-driven turbine is difficult to control accurately, and investment of a hydraulic circulation system is large, which brings difficulties to research and development of a double-turbine generator control system. In addition, the double-turbine generator stabilized platform achieves dynamic balance by using the resultant force of acting force of the two turbines, and the upper turbine generator and the lower turbine generator interact in a working process, which makes it difficult to control the stabilized platform. Therefore, design of a ground testing method and a control system for the double-turbine generator stabilized platform is particularly critical.

A single-axis stabilized platform device for a rotary steerable drilling tool and a stabilizing method therefor are disclosed in the Chinese patent application with publication No. CN 103277047 A. The single-axis stabilized platform device and the stabilizing method therefor are particularly disclosed, but a specific method for the design of a control system is not disclosed in the patent application, and a ground testing method is not provided.

A control method for a stabilized platform in a rotary steerable system is disclosed in the Chinese patent application with publication No. CN 114215501 A. The control method for a stabilized platform in a rotary steerable system is particularly disclosed to solve the problem that controls over a stabilized platform of a rotary steerable system in the prior art is likely to be affected by internal nonlinear interference. A control method for a torque generator is further disclosed in the patent application, but bus voltage control and tool face angle control methods when an upper turbine engine (i.e. an upper turbine generator) and the torque generator (i.e. a lower turbine generator) work together is not disclosed, and a ground testing method is not provided.

In the document entitled Hamid Alturbeh, James E Whidborne, Patrick Luk, et al. Modelling and control of the roll-stabilised control unit of a rotary steerable system directional drilling tool[J]. *The Journal of Engineering*, 2019, 2019(17):4555-4559, a control method for a double-turbine generator stabilized platform is analyzed, and a control system block diagram and a controller design method are provided. The disadvantages of the control method for a stabilized platform are as follows: a control system for double turbine generators is designed independently, so it can not make full use of measurement information of sensors. This document only designs the control method for a double-turbine generator stabilized platform, and a ground testing method is not provided.

To sum up, it is necessary to design a ground testing device for a stabilized platform of a rotary steerable drilling tool.

SUMMARY

Aiming at the above problems, the present invention provides a ground testing device for a stabilized platform of a rotary steerable drilling tool, which can perform vibration simulation and can also perform interference loading and high-temperature simulation, thereby achieving ground tests of different types of mechanical stabilized platforms.

In order to achieve the above objective, the present invention provides a ground testing device for a stabilized platform of a rotary steerable drilling tool. The device includes a drill collar assembly, where the drill collar assembly includes a drill collar and a drill collar motor, and a stabilized platform mounting assembly is arranged inside the drill collar for mounting the stabilized platform. The ground testing device further includes:

- a first supporting member, where the drill collar motor is mounted outside the first supporting member, and a motor shaft of the drill collar motor penetrates the first supporting member and is connected to the drill collar;
- a second supporting member arranged opposite the first supporting member and provided with a first mounting hole; and
- a vibration mechanism including a first vibration member connected to the drill collar and a second vibration member arranged in the first mounting hole in a sleeved manner, where an elastic member is arranged between the second vibration member and the second supporting member, the elastic member is arranged on the second vibration member in a sleeving manner, an end portion of the first vibration member is provided with first vibration teeth, an end portion of the second vibration member is provided with second vibration teeth matching the first vibration teeth, in a rotation process of the drill collar, the second vibration teeth are separated from the first vibration teeth and meshed with the first vibration teeth under an action of the elastic member, so as to automatically open and close to generate vibration, and the second vibration member is provided with a first stop member which matches a second stop member arranged in the first mounting hole, so as to prevent the second vibration member from rotating around an axis of the drill collar when moving in an axial direction of the drill collar.

In some examples, the ground testing device further includes an interference loading assembly, where the interference loading assembly includes a pressurizing member mounted on a side wall of the drill collar and a friction member mounted on the stabilized platform, one end of the pressurizing member is in close contact with the friction member to generate interference torque, and the pressurizing member is in threaded connection to the drill collar and moves in a radial direction of the drill collar during rotation.

In some examples, the stabilized platform mounting assembly includes a first mounting member, a stabilized platform main body is mounted inside the first mounting member, and a side wall of the first mounting member is provided with a heating device so as to simulate a downhole high-temperature environment.

Preferably, the stabilized platform mounting assembly further includes a second mounting member, a third mounting member and a fourth mounting member that are separately and detachably connected to an end portion of the first mounting member, the second mounting member is provided with a first through hole, and the third mounting member is provided with a second through hole.

When a single-motor stabilized platform is tested, the second mounting member or the third mounting member is mounted at one end of the first mounting member, and the fourth mounting member is mounted at the other end of the first mounting member. A single-motor stabilized platform driving motor is arranged on the side, far away from the first mounting member, of the second mounting member or the third mounting member, and a motor shaft of the single-motor stabilized platform driving motor penetrates the first through hole or the second through hole and is connected to the single-motor stabilized platform.

When a double-turbine generator stabilized platform is tested, the second mounting member is arranged at one end of the first mounting member, and the third mounting member is arranged at the other end of the first mounting member. An upper turbine generator rotor driving motor is arranged on the side, far away from the first mounting member, of the second mounting member, and a motor shaft of the upper turbine generator rotor driving motor penetrates the first through hole and is connected to an upper turbine generator so as to drive the upper turbine generator. A lower turbine generator rotor driving motor is arranged on the side, far away from the first mounting member, of the third mounting member, and a motor shaft of the lower turbine generator rotor driving motor penetrates the second through hole and is connected to a lower turbine generator so as to drive the lower turbine generator.

In some examples, the ground testing device further includes a control unit, where the control unit includes a main controller, a driving controller, and a measurement unit. The driving controller includes an upper turbine generator driving controller for driving the upper turbine generator to rotate and a lower turbine generator driving controller for driving the lower turbine generator to rotate, and the measurement unit includes an upper current sensor for measuring a current of the upper turbine generator, a lower current sensor for measuring a current of the lower turbine generator, a tool face angle measurement unit for measuring a tool face angle, a voltage sensor for measuring a bus voltage, and a rotating speed sensor for measuring a rotating speed of the lower turbine generator. The main controller provides current set values for the upper turbine generator driving controller and the lower turbine generator driving controller respectively according to measurement data of the upper current sensor, measurement data of the lower current sensor, measurement data of the voltage sensor, measurement data of the rotating speed sensor, measurement data of the tool face angle measurement unit, a tool face angle set value, a direct current bus voltage set value and external working condition information so as to adjust electromagnetic torque of the upper turbine generator and the lower turbine generator.

In some examples, the main controller includes:

- a stabilized platform controller configured to: receive the direct current bus voltage set value $V^*$ and the tool face angle set value $\varphi^*$, dynamically adjust a set value $\tilde{V}^*$ of a bus voltage controller and a set value $\tilde{\varphi}^*$ of a tool face angle controller according to the external working condition information, the measurement data of the upper current sensor, the measurement data of the lower current sensor, the measurement data of the voltage sensor, the measurement data of the rotating speed sensor and the measurement data of the tool face angle measurement unit, and provide a correction amount $\omega$ to a rotating speed controller to correct the rotating speed controller;
- the bus voltage controller configured to: dynamically adjust the current set value of the upper turbine generator driving controller according to the set value $\tilde{V}^*$ and the measurement data of the voltage sensor so as to adjust the electromagnetic torque of the upper turbine generator;

the tool face angle controller configured to: dynamically adjust the set value of the rotating speed controller according to $\tilde{\varphi}^*$ and a tool face angle measurement value obtained by means of the tool face angle measurement unit; and the rotating speed controller configured to: dynamically adjust the current set value of the lower turbine generator driving controller according to the rotating speed set value, a measurement value of the rotating speed sensor, a measurement value of the lower current sensor, and the correction amount of the rotating speed controller so as to adjust the electromagnetic torque of the lower turbine generator.

In some examples, the upper turbine generator driving controller includes an upper current controller and an upper inverter circuit, and the upper inverter circuit is connected to the upper turbine generator. The upper current controller is configured to: receive the current set value of the upper turbine generator driving controller given by the bus voltage controller, and dynamically adjust a conduction state of the upper inverter circuit according to the measurement data of the upper current sensor so as to adjust the electromagnetic torque of the upper turbine generator.

In some examples, the lower turbine generator driving controller includes a lower current controller and a lower inverter circuit, and the lower inverter circuit is connected to the lower turbine generator. The lower current controller is configured to: receive the current set value of the lower turbine generator driving controller given by the rotating speed controller, and dynamically adjust a conduction state of the lower inverter circuit according to the measurement data of the lower current sensor so as to adjust the electromagnetic torque of the lower turbine generator.

In some examples, the stabilized platform controller has an optimizing index as follows:

$$\min obj = \alpha_1(V-\tilde{V}^*)^2 + \alpha_2(\varphi-\tilde{\varphi}^*)^2 + \alpha_3(V-V^*)^2 + \alpha_4(\varphi-\varphi^*)^2$$

The following constraints are satisfied:

$$\begin{cases} V^*_{min} \leq \tilde{V}^* \leq V^*_{max} \\ \varphi^*_{min} \leq \tilde{\varphi}^* \leq \varphi^*_{max} \\ P^2_{upper} + P^2_{lower} \leq 2P^2_e \end{cases},$$

In the formula, $\alpha_1$, $\alpha_2$, $\alpha_3$ and $\alpha_4$ are optimization target weight coefficients, V is a measurement value of the voltage sensor, q is a measurement value of the tool face angle measurement unit, $V^*_{min}$ and $V^*_{max}$ are fluctuation boundaries allowed by the set value of the bus voltage controller, $\varphi^*_{min}$, and $\varphi^*_{max}$ are fluctuation boundaries allowed by the set value of the tool face angle controller, $P_{upper}$ is power of the upper turbine generator, $P_{lower}$ is power of the lower turbine generator, and $P_e$ is rated power of the generator.

In some examples, the main controller includes:
the stabilized platform controller configured to: directly send the received direct current bus voltage set value V* to the bus voltage controller, directly send the received tool face angle set value φ* to the tool face angle controller, and send the measurement data of the upper current sensor to the rotating speed controller as a correction amount ω;

the bus voltage controller configured to: dynamically adjust the current set value of the upper turbine generator driving controller according to the set value V* and the measurement data of the voltage sensor so as to adjust the electromagnetic torque of the upper turbine generator;

the tool face angle controller configured to: dynamically adjust the set value of the rotating speed controller according to φ* and a tool face angle measurement value obtained by means of the tool face angle measurement unit; and the rotating speed controller configured to: dynamically adjust the current set value of the lower turbine generator driving controller according to the rotating speed set value, a measurement value of the rotating speed sensor, a measurement value of the lower current sensor, and the correction amount of the rotating speed controller so as to adjust the electromagnetic torque of the lower turbine generator.

Compared with the prior art, the present invention has the advantages and positive effects as follows:

(1) According to the ground testing device for the stabilized platform of the present invention, rotation of the drill collar during drilling is simulated by means of the drill collar assembly, the vibration mechanism cooperates with the drill collar assembly to generate downhole vibration in a rotation process of the drill collar, and different stabilized platforms are replaced and mounted by means of the stabilized platform mounting assembly, such that ground tests of different types of mechanical stabilized platforms are achieved.

(2) The ground testing device for the stabilized platform of the present invention is provided with the interference loading assembly, which can perform load interference simulation, that is, friction force between the pressurizing member and the friction member is adjusted by rotating the pressurizing member to apply interference torque to the stabilized platform to be tested, such that torque interference during drilling is simulated and tested, and influence of the torque interference on the stabilized platform is tested.

(3) According to the ground testing device for the stabilized platform of the present invention, the elastic member is arranged between the second vibration member and the second supporting member of the vibration mechanism, and force of vibration can be adjusted by adjusting acting force of the elastic member. Moreover, different vibration situations can be simulated by replacing tooth shapes of the vibration teeth, thereby achieving ground tests of the stabilized platform under different vibrations.

(4) According to the ground testing device for the stabilized platform of the present invention, a heating device is arranged outside the first mounting member of the stabilized platform mounting assembly, and the heating device is used for heating to provide a high-temperature environment for the stabilized platform to be tested, thereby simulating and testing influence of a downhole temperature on the stabilized platform.

(5) According to the ground testing device for the stabilized platform of the present invention, when the double-turbine stabilized platform is tested, a double-layer control design structure is employed in the control unit, the main controller can obtain all the sensor data of the upper turbine generator, the lower turbine generator and the tool face angle measurement unit, and cooperative control over the upper turbine generator and the lower turbine generator is achieved by adjusting the set values of the upper turbine generator driving controller and the lower turbine generator driving controller in real time, such that control performance of the stabilized platform is improved.

(6) According to the ground testing device for the stabilized platform of the present invention, when the ground test is performed, downhole working states of the double turbine generators are simulated by means of the upper turbine generator rotor driving motor, the upper turbine generator, the lower turbine generator rotor driving motor and the lower turbine generator, and ground simulation of the turbine generators can be performed without circulation of a drilling fluid. In addition, the turbine torque can be simulated by adjusting the torque of the upper turbine generator rotor driving motor and the torque of the lower turbine generator rotor driving motor, such that convenience and controllability of a ground experiment are improved. In addition, by replacing part of the components in the stabilized platform mounting assembly, the stabilized platform mounting assembly is suitable for the single-motor stabilized platform, such that the ground test can be performed on the single-motor stabilized platform.

In the figures, 1, first supporting member, 2, second supporting member, 301, drill collar body, 302, first end cover, 303, second end cover, 4, drill collar motor, 501, first mounting member, 502, second mounting member, 503, third mounting member, 504, fourth mounting member, 6, first vibration member, 7, second vibration member, 701, vibration portion, 702, connection portion, 8, elastic member 9, first vibration tooth, 10, second vibration tooth, 11, first stop member, 12, pressurizing member, 13, stabilized platform, 14, friction member, 15, stabilized platform main body, 16, heating device, 17, single-motor stabilized platform driving motor, 18, single-motor stabilized platform first end cover 19, single-motor stabilized platform second end cover, 20, first coupler, 21, first conductive slip ring, 22, second coupler, 23, second conductive slip ring, 24, upper turbine generator rotor driving motor, 25, upper turbine generator, 26, lower turbine generator rotor driving motor, 27, lower turbine generator, 28, double-turbine generator stabilized platform first end cover, 29, double-turbine generator stabilized platform second end cover, 30, third coupler, 31, fourth coupler, 32, third conductive slip ring, 33, fourth conductive slip ring, 34, drill collar bearing block, 35, bottom plate, 36, stabilized platform measurement and control circuit mounting support, 37, upper turbine generator driving controller, 38, lower turbine generator driving controller, and 39, load.

DETAILED DESCRIPTION OF THE EMBODIMENTS

The present invention will be described in detail below in combination with exemplary embodiments. However, it should be understood that elements, structures and features in one embodiment can also be usefully incorporated into other embodiments without further description.

In the description of the present invention, it should be noted that orientation or position relations indicated by the terms "upper", "lower", "left", "right", "inner", "outer", etc. are based on orientation or position relations shown in the accompanying drawings, and are merely for facilitating the description of the present invention and simplifying the description, rather than indicating or implying the device or element referred to must have a specific orientation or be constructed and operated in a specific orientation, and therefore will not be interpreted as limiting the present invention. In addition, the terms "first", "second", "third" and "fourth" are merely for descriptive purposes only and should not be construed as indicating or implying relative importance.

Figure 1:
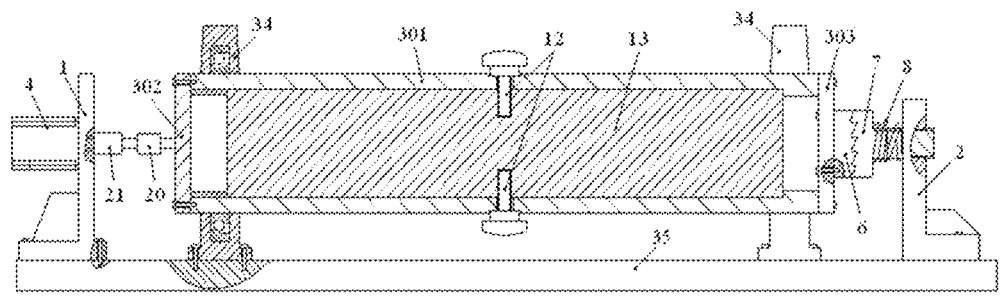
FIG. 1 is a schematic structural diagram of a ground testing device for a stabilized platform of a rotary steerable drilling tool mentioned in a particular example of the present invention.

Referring to FIG. 1, an example of the present invention provides a ground testing device for a stabilized platform of a rotary steerable drilling tool. The device includes a first supporting member 1, a second supporting member 2, a drill collar assembly, and a vibration mechanism, where the first supporting member 1 and the second supporting member 2 are oppositely arranged, and the drill collar assembly and the vibration mechanism are sequentially arranged between the first supporting member 1 and the second supporting member 2. The drill collar assembly is connected to the first supporting member 1, and the vibration mechanism is connected to the second supporting member 2. When a ground test is performed on the stabilized platform, the drill collar assembly simulates rotation of a drill collar during drilling, and the vibration mechanism cooperates with the drill collar assembly to generate downhole vibration during the rotation of the drill collar, such that simulation of a vibration environment is achieved, and ground tests of the stabilized platform under different vibration are achieved.

Referring to FIG. 1, the drill collar assembly includes a drill collar and a drill collar motor 4 arranged outside the first supporting member 1, and a motor shaft of the drill collar motor 4 penetrates the first supporting member 1 and is connected to the drill collar. A stabilized platform mounting assembly is arranged inside the drill collar for mounting the stabilized platform. The drill collar includes a drill collar body 301, a first end cover 302 connected to the drill collar motor 4 and a second end cover 303 connected to the vibration mechanism. One end of the drill collar body 301 is connected to the first end cover 302 (for example, a connection is achieved by means of bolts), and the other end of the drill collar body 301 is connected to the second end cover 303 (for example, a connection is achieved by means of bolts). The stabilized platform mounting assembly is mounted in the drill collar body 301, and two end portions of the drill collar body 301 are mounted and fixed by means of drill collar bearing blocks 34. When the ground test is performed on the stabilized platform, the drill collar motor drives the drill collar to rotate to simulate the rotation of the drill collar during drilling, and different rotation conditions of the drill collar in a drilling process may be simulated by controlling a rotating speed of the drill collar motor.

In a particular embodiment, the drill collar motor 4 is connected to the first end cover 302 by means of a first coupler. Power and torque are transmitted by means of the first coupler 20. A first conductive slip ring 21 is arranged inside the first supporting member 1, and the first conductive slip ring 21 is arranged on a motor shaft of the drill collar motor 4 in a sleeving manner. An external power supply and a communication line supply power to the stabilized platform to be tested by means of the first conductive slip ring 21. Under the action of the first conductive slip ring, a wire is prevented from being wound.

Figure 2:
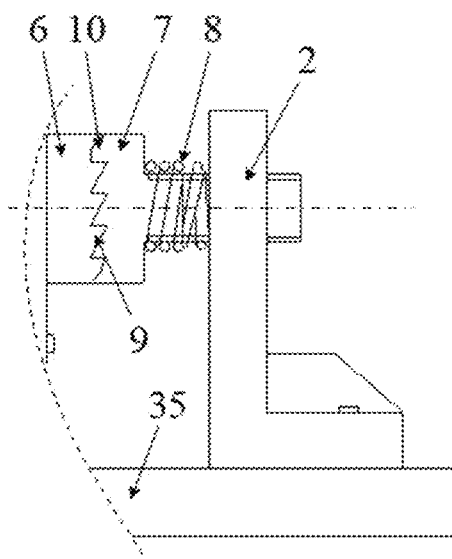
FIG. 2 is a schematic diagram of a meshed and compressed state between a first vibration member and a second vibration member of a vibration mechanism in a particular example of the present invention.
Figure 3:
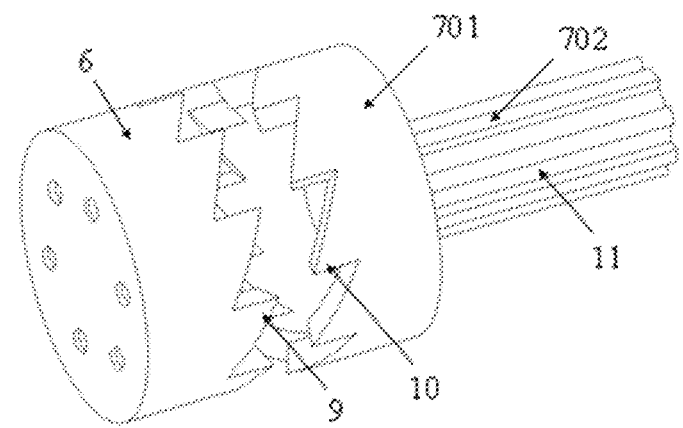
FIG. 3 is a three-dimensional schematic diagram of a vibration mechanism in a particular example of the present invention.

Referring to FIGS. 1-3, the vibration mechanism includes a first vibration member 6 connected to the second end cover 303 and a second vibration member 7 arranged in a first mounting hole (not shown in the figure) in a sleeved manner, where an elastic member 8 is arranged between the second vibration member 7 and the second supporting member 2, and the elastic member 8 is arranged on the second vibration member 7 in a sleeving manner. The end portion, far away from the second end cover 303, of the first vibration member 6 is provided with first vibration teeth 9, and an end portion of the second vibration member 7 is provided with second vibration teeth 10 matching the first vibration teeth 9. In a rotation process of the drill collar, the second vibration teeth 10 are separated from the first vibration teeth 9 and meshed with the first vibration teeth 9 under an action of the elastic member 8, so as to automatically open and close to generate vibration. The elastic member is a compression spring, but not limited to the compression spring. When a vibration test is performed on the stabilized platform, the elastic member provides acting force for meshing between the first vibration teeth and the second vibration teeth. The acting force of the elastic member may be adjusted by adjusting a position of the second supporting member, thereby adjusting vibration force.

Figure 4:
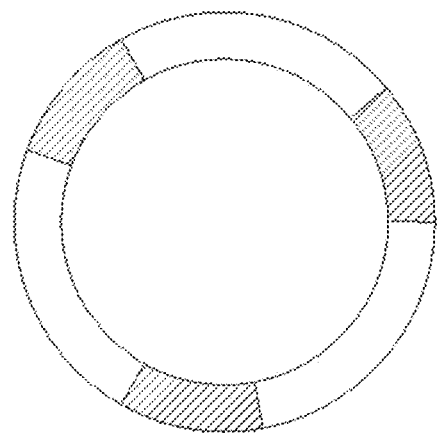
FIGS. 4-7 show schematic structural diagrams of vibration teeth of different designs of a vibration mechanism in a particular example of the present invention (diagonal and dashed lines represent positions of the teeth, and the white represents positions without teeth)
Figure 5:
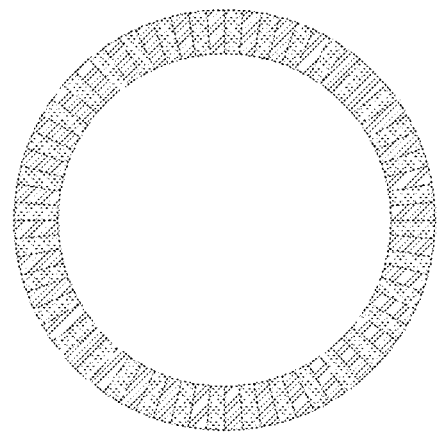
Figure 6:
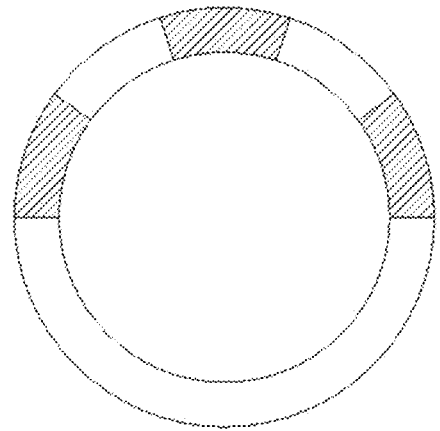
Figure 7:
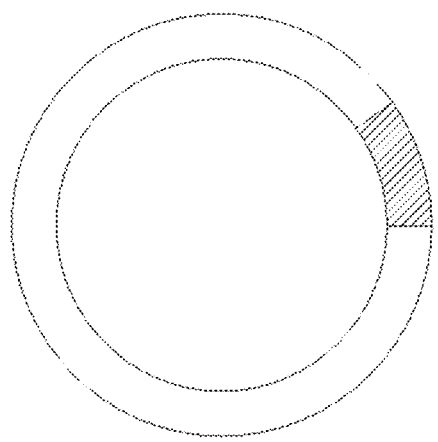

It should be noted that there are many design forms of the vibration teeth, and different vibration tooth structures may be designed according to different vibration test requirements. For example, referring to FIG. 4, there are three first vibration teeth and three second vibration teeth, the three first vibration teeth are evenly distributed on the circumference of the end portion of the first vibration member, and the three second vibration teeth are evenly distributed on the circumference of the end portion of the second vibration member. When the first vibration teeth and the second vibration teeth are arranged in this way, the vibration mechanism may generate three times of even vibration along with rotation of the drill collar. Referring to FIG. 5, seventy-two vibration teeth are uniformly distributed on the circumference of the end portion of each of the first vibration member and the second vibration member. When the first vibration teeth and the second vibration teeth are arranged in this way, the vibration mechanism may generate continuous vibration along with the rotation of the drill collar. Referring to FIG. 6, three vibration teeth are uniformly distributed on half of the circumference of the end portion of each of the first vibration member and the second vibration member. When the first vibration teeth and the second vibration teeth are arranged in this way, the vibration mechanism may generate three times of nonuniform vibration along with the rotation of the drill collar. Referring to FIG. 7, only one vibration tooth is arranged on the circumference of the end portion of each of the first vibration member and the second vibration member, and when the first vibration tooth and the second vibration tooth are arranged in this way, the vibration mechanism may generate vibration once along with the rotation of the drill collar.

Referring to FIG. 3, the second vibration member is provided with a first stop member 11, which matches a second stop member (not shown in the figure) arranged in the first mounting hole (not shown in the figure) so as to prevent the second vibration member 7 from rotating around an axis of the drill collar when moving along an axial direction of the drill collar. In a particular embodiment, the first stop member is a groove provided in the second vibration member, and the second stop member is a boss arranged in the first mounting hole and matches the groove. The number of the groove corresponds to the number of the boss, at least one groove and boss are arranged, and the number of the groove and the boss may be one, two, three, etc., and the specific design is based on actual requirements. In another particular embodiment, the first stop member is a boss arranged on the second vibration member, and the second stop member is a groove provided in the first mounting hole and matches the boss. The number of the boss corresponds to the number of the groove, at least one boss and groove are arranged, and the number of the boss and the groove may be one, two, three, etc., and the specific design is based on actual requirements.

In some particular examples, referring to FIGS. 1-3, the second vibration member 7 includes a vibration portion 701 and a connection portion 702, and a radial size of the connection portion 702 is smaller than a radial size of the vibration portion 701. The second vibration teeth 10 are arranged at the end portion, close to the first vibration member 6, of the vibration portion. The elastic member 8 is arranged on the connection portion 702 in a sleeving manner and located between the vibration portion 701 and the second supporting member 2. The first stop member 11 is arranged on an outer wall of the connection portion 702. The radial size of the vibration portion is larger than that of the connection portion, such that the position of the elastic member is limited between the vibration portion and the second supporting member. In the rotation process of the drill collar, after the first vibration teeth and the second vibration teeth are separated, the elastic member meshes the first vibration teeth with the second vibration teeth by means of acting force of the elastic member so as to generate vibration.

Figure 8:
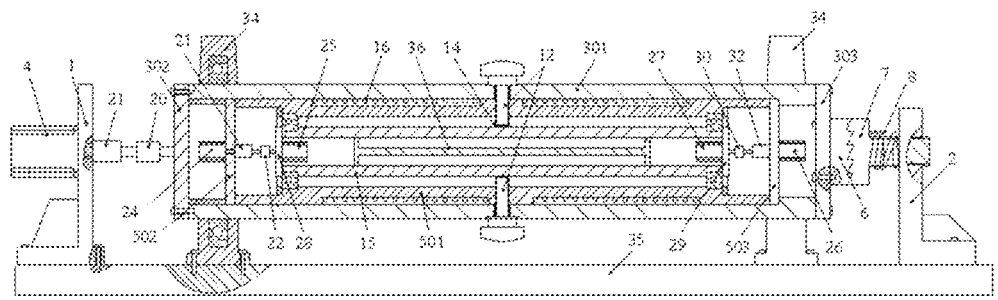
FIG. 8 is a schematic structural diagram of a ground testing device for a stabilized platform of a rotary steerable drilling tool equipped with a double-turbine generator stabilized platform of the present invention.

Referring to FIG. 1, FIG. 2, and FIG. 8, the above testing device further includes a bottom plate 35, and the first supporting member 1, the second supporting member 2, and the drill collar bearing blocks 34 are all mounted on the bottom plate 35 by means of bolts. The end, provided with the second supporting member 2, of the bottom plate 35 is provided with a plurality of mounting holes arranged in sequence, and the second supporting member is mounted in different mounting holes, such that the acting force of the elastic member may be adjusted, thereby adjusting vibration force.

In some particular examples, referring to FIG. 1 and FIG. 8, the above ground testing device further includes an interference loading assembly, where the interference loading assembly includes a pressurizing member 12 mounted on a side wall of the drill collar and a friction member 14 mounted on the stabilized platform 13, and one end of the pressurizing member 12 is in close contact with the friction member 14 to generate interference torque. The pressurizing member 12 is in a threaded connection to the drill collar, and the pressurizing member 12 moves along a radial direction of the drill collar during rotation. Specifically, the pressurizing member is a pressurizing rod, and the friction member is a friction plate. One end of the pressurizing rod is in close contact with the friction plate, and friction force between the pressurizing rod and the friction plate may be adjusted by rotating the pressurizing rod, such that rotation torque of the drill collar is transmitted to the stabilized platform, and influence of the interference torque on the control performance of the stabilized platform is tested.

Figure 9:
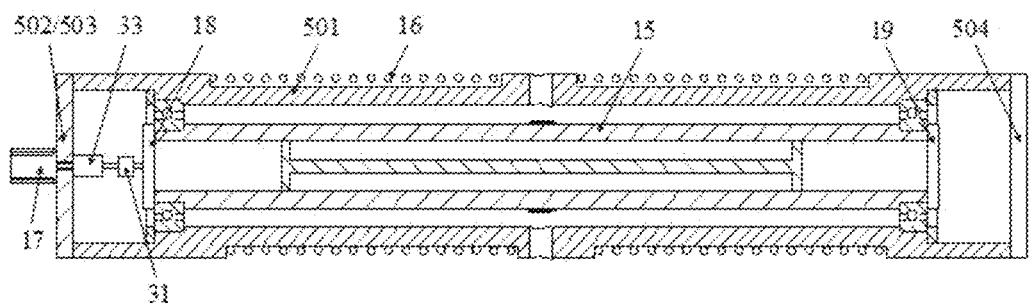
FIG. 9 is a schematic structural diagram of a ground testing device for a stabilized platform of a rotary steerable drilling tool equipped with a single-motor stabilized platform in an example of the present invention.

Referring to FIG. 8 and FIG. 9, the stabilized platform mounting assembly includes a first mounting member 501, a stabilized platform main body 15 is mounted inside the first mounting member 501, and a side wall of the first mounting member 501 is provided with a heating device 16 so as to simulate a downhole high-temperature environment. Specifically, a groove is provided in a side wall of the first mounting member 501, and the heating device is mounted in the groove. In a particular embodiment, a nichrome resistance wire is used as the heating device, the heating device is not limited to the nichrome resistance wire, and other types of heating elements may be used in the design of the heating device.

Referring to FIG. 8 and FIG. 9, the stabilized platform mounting assembly further includes a second mounting member 502, a third mounting member 503, and a fourth mounting member 504 that are separately and detachably connected to an end portion of the first mounting member 501, the second mounting member 502 is provided with a first through hole (not shown in the figure), and the third mounting member 503 is provided with a second through hole (not shown in the figure).

When a double-turbine generator stabilized platform is tested, referring to FIG. 8, the second mounting member 502 is arranged at one end of the first mounting member 501, and the third mounting member 503 is arranged at the other end of the first mounting member 501. An upper turbine generator rotor driving motor 24 is arranged on the side, far away from the first mounting member 501, of the second mounting member 502, and a motor shaft of the upper turbine generator rotor driving motor 24 penetrates the first through hole and is connected to an upper turbine generator 25 by means of a second coupler 22 so as to drive the upper turbine generator 25. A lower turbine generator rotor driving motor 26 is arranged on the side, far away from the first mounting member 501, of the third mounting member 503, and a motor shaft of the lower turbine generator rotor driving motor 26 penetrates the second through hole and is connected to a lower turbine generator 27 by means of a third coupler 30 so as to drive the lower turbine generator 27. The double-turbine generator stabilized platform includes a stabilized platform main body 15, a double-turbine generator stabilized platform first end cover 28 and a double-turbine generator stabilized platform second end cover 29, where one end of the stabilized platform main body 15 is connected to the double-turbine generator stabilized platform first end cover 28, and the other end is connected to the double-turbine generator stabilized platform second end cover 29. A second conductive slip ring 23 is mounted on the side, close to the first mounting member 501, of the second mounting member 502, and the second conductive slip ring 23 is arranged on the motor shaft of the upper turbine generator rotor driving motor 24 in a sleeving manner. A third conductive slip ring 32 is mounted on the side, close to the first mounting member 501, of the third mounting member 503, and the third conductive slip ring 32 is arranged on the motor shaft of the lower turbine generator rotor driving motor 26 in a sleeving manner. An external power supply and a communication line supply power to the lower turbine generator rotor driving motor 26 by means of the third conductive slip ring 32. Under the action of the second conductive slip ring, a wire connected to the upper turbine generator rotor driving motor is prevented from being wound. Under the action of the third conductive slip ring, a wire connected to the lower turbine generator rotor driving motor is prevented from being wound.

It should be noted that in the double-turbine generator stabilized platform shown in FIG. 8, a mechanical structure of the turbine portion of the upper turbine generator and a mechanical structure of the turbine portion of the lower turbine generator are omitted, a rotor of the upper turbine generator is directly connected to the upper turbine generator rotor driving motor, and a rotor of the lower turbine generator is directly connected to the lower turbine generator rotor driving motor.

When a ground test is performed on the double-turbine generator stabilized platform, the upper turbine generator rotor driving motor 24 and the upper turbine generator 25 jointly simulate a function of the upper turbine generator of the double-turbine generator stabilized platform. Specific operation manner is as follows: Assuming that torque generated by means of mud scouring of the upper turbine rotor is $T_L^{up}$, in order to test the performance of the stabilized platform under this torque, the upper turbine generator rotor driving motor 24 drives the rotor of the upper turbine generator 25 to rotate with the torque of $T_L^{up}$ so as to achieve a test function of the upper turbine generator. Similarly, the lower turbine generator rotor driving motor 26 and the lower turbine generator 27 work together to achieve a test function of the lower turbine generator.

Figure 10:
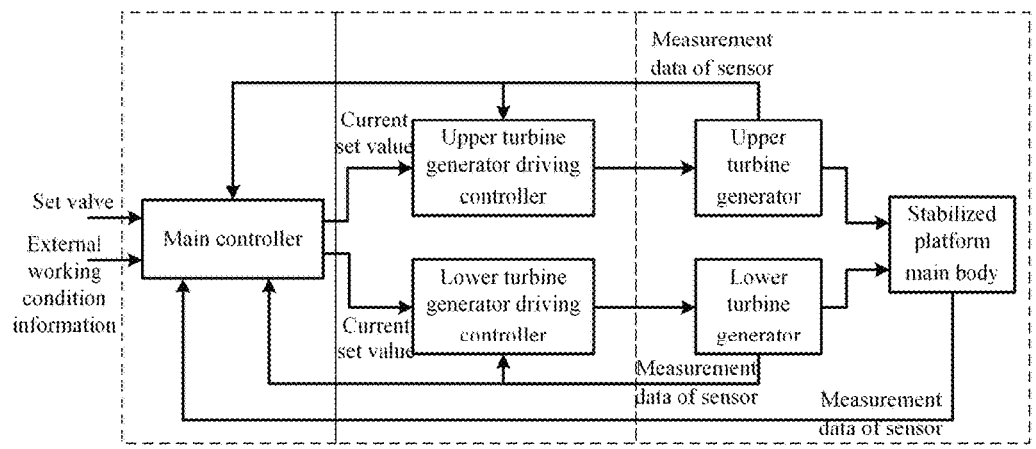
FIG. 10 and FIG. 11 show control block diagrams of a ground testing device for a stabilized platform of a rotary steerable drilling tool equipped with a double-turbine generator stabilized platform in an example of the present invention.
Figure 11:
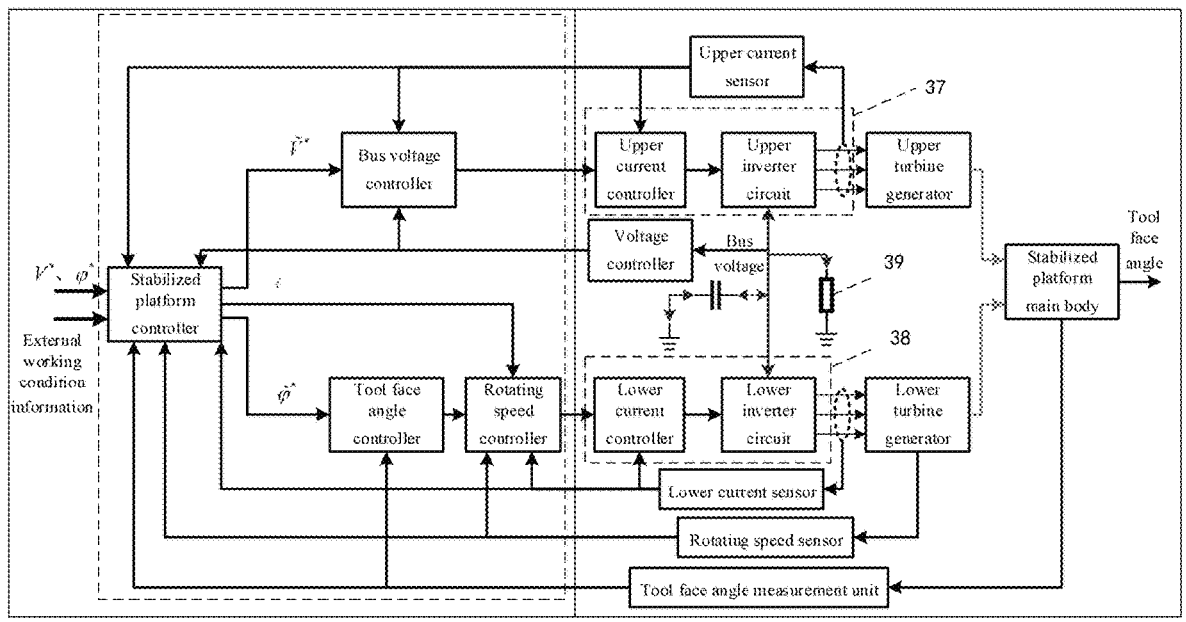

Referring to FIG. 10 and FIG. 11, a control unit is further included, where the control unit includes a main controller, a driving controller, and a measurement unit. The driving controller includes an upper turbine generator driving controller for driving the upper turbine generator to rotate and a lower turbine generator driving controller for driving the lower turbine generator to rotate, and the measurement unit includes an upper current sensor for measuring a current of the upper turbine generator, a lower current sensor for measuring a current of the lower turbine generator, a tool face angle measurement unit for measuring a tool face angle, a voltage sensor for measuring a bus voltage, and a rotating speed sensor for measuring a rotating speed of the lower turbine generator. The main controller provides current set values for the upper turbine generator driving controller and the lower turbine generator driving controller respectively according to measurement data of the upper current sensor, measurement data of the lower current sensor, measurement data of the voltage sensor, measurement data of the rotating speed sensor, measurement data of the tool face angle measurement unit, a tool face angle set value, a direct current bus voltage set value and external working condition information so as to adjust electromagnetic torque of the upper turbine generator and the lower turbine generator.

When a single-motor stabilized platform is tested, referring to FIG. 9, the second mounting member 502 or the third mounting member 503 is mounted at one end of the first mounting member 501, and the fourth mounting member 504 is mounted at the other end of the first mounting member 501. A single-motor stabilized platform driving motor 17 is arranged on the side, far away from the first mounting member 501, of the second mounting member 502 or the third mounting member 503, and a motor shaft of the single-motor stabilized platform driving motor 17 penetrates the first through hole or the second through hole and is connected to the single-motor stabilized platform. The single-motor stabilized platform includes a stabilized platform main body 15, a single-motor stabilized platform first end cover 18, and a single-motor stabilized platform second end cover 19. One end of the stabilized platform main body 15 is connected to the single-motor stabilized platform first end cover 18, and the other end is connected to the single-motor stabilized platform second end cover 19. The motor shaft of the single-motor stabilized platform driving motor 17 is connected to the single-motor stabilized platform first end cover 18 by means of a fourth coupler 31. A fourth conductive slip ring 33 is mounted on the side, close to the first mounting member 501, of the second mounting member 502 or the third mounting member 503, and the fourth conductive slip ring 33 is arranged on the motor shaft of the single-motor stabilized platform driving motor 17 in a sleeving manner. An external power supply and a communication line supply power to the single-motor stabilized platform by means of the fourth conductive slip ring 33. Under the action of the fourth conductive slip ring, a wire connected to the single-motor stabilized platform is prevented from being wound.

In some particular examples, referring to FIG. 10 and FIG. 11, the main controller includes:
- a stabilized platform controller configured to: receive the direct current bus voltage set value V* and the tool face angle set value φ*, dynamically adjust a set value $\tilde{V}^*$ of a bus voltage controller and a set value $\tilde{\varphi}^*$ of a tool face angle controller according to the external working condition information, the measurement data of the upper current sensor, the measurement data of the lower current sensor, the measurement data of the voltage sensor, the measurement data of the rotating speed sensor and the measurement data of the tool face angle measurement unit, and provide a correction amount $\tilde{\omega}$ to a rotating speed controller to correct the rotating speed controller;
- the bus voltage controller configured to: dynamically adjust the current set value of the upper turbine generator driving controller according to the set value $\tilde{V}^*$ and the measurement data of the voltage sensor so as to adjust the electromagnetic torque of the upper turbine generator;
- the tool face angle controller configured to: dynamically adjust the set value of the rotating speed controller according to $\tilde{\varphi}^*$ and a tool face angle measurement value obtained by means of the tool face angle measurement unit; and
- the rotating speed controller configured to: dynamically adjust the current set value of the lower turbine generator driving controller according to the rotating speed set value, a measurement value of the rotating speed sensor, a measurement value of the lower current sensor, and a correction value of the rotating speed controller so as to adjust the electromagnetic torque of the lower turbine generator.

In some particular examples, referring to FIG. 11, the upper turbine generator driving controller 37 includes an upper current controller and an upper inverter circuit, and the upper inverter circuit is connected to the upper turbine generator. The upper current controller is configured to: receive the current set value of the upper turbine generator driving controller given by the bus voltage controller, and dynamically adjust a conduction state of the upper inverter circuit according to the measurement data of the upper current sensor so as to adjust the electromagnetic torque of the upper turbine generator.

In some particular examples, referring to FIG. 11, the lower turbine generator driving controller 38 includes a lower current controller and a lower inverter circuit, and the lower inverter circuit is connected to the lower turbine generator. The lower current controller is configured to: receive the current set value of the lower turbine generator driving controller given by the rotating speed controller, and dynamically adjust a conduction state of the lower inverter circuit according to the measurement data of the lower current sensor so as to adjust the electromagnetic torque of the lower turbine generator.

The stabilized platform controller has an optimizing index as follows:

$$\min \text{obj} = \alpha_1(V-\tilde{V}^*)^2 + \alpha_2(\varphi-\tilde{\varphi}^*)^2 + \alpha_3(V-V^*)^2 + \alpha_4(\varphi-\varphi^*)^2.$$

The following constraints are satisfied:

$$\begin{cases} V^*_{min} \le \tilde{V}^* \le V^*_{max} \\ \varphi^*_{min} \le \tilde{\varphi}^* \le \varphi^*_{max} \\ P^2_{upper} + P^2_{lower} \le 2P^2_e \end{cases}.$$

In the formula, $\alpha_1$, $\alpha_2$, $\alpha_3$ and $\alpha_4$ are optimization target weight coefficients, V is a measurement value of the voltage sensor, φ is a measurement value of the tool face angle measurement unit, $V^*_{min}$ and $V^*_{max}$ are fluctuation boundaries allowed by the set value of the bus voltage controller, $\varphi^*_{min}$ and $\varphi^*_{max}$ are fluctuation boundaries allowed by the set value of the tool face angle controller, $P_{upper}$ is power of the upper turbine generator, $P_{lower}$ is power of the lower turbine generator, and $P_e$ is rated power of the generator.

It should be noted that the optimization target weight coefficients of the stabilized platform controller may be changed according to the external working condition information, and an optimization target of the stabilized platform controller may be changed by adjusting the optimization target weight coefficients. For example, an increase of $\alpha_1$ and $\alpha_3$ means that an optimization algorithm pays more attention to the control performance of the bus voltage, whereas an increase of $\alpha_2$ and $\alpha_4$ means that the optimization algorithm pays more attention to the control performance of the tool face angle.

Based on the above main controller structure, the set values of the bus voltage controller and the tool face angle controller are no longer given directly from the outside, but are corrected in real time by the stabilized platform controller according to a current operation condition of the control unit. A dual objective dynamic optimization process of the main controller is achieved by dynamically adjusting the set value $\tilde{V}^*$ of the bus voltage controller and the set value $\tilde{\varphi}^*$ of the tool face angle controller.

In some particular examples, referring to FIG. 11, the main controller includes:

the stabilized platform controller configured to: directly send the received direct current bus voltage set value V* to the bus voltage controller, directly send the received tool face angle set value φ* to the tool face angle controller, and send the measurement data of the upper current sensor to the rotating speed controller as a correction amount;

the bus voltage controller configured to: dynamically adjust the current set value of the upper turbine generator driving controller according to the set value V* and the measurement data of the voltage sensor so as to adjust the electromagnetic torque of the upper turbine generator;

the tool face angle controller configured to: dynamically adjust the set value of the rotating speed controller according to φ* and a tool face angle measurement value obtained by means of the tool face angle measurement unit; and the rotating speed controller configured to: dynamically adjust the current set value of the lower turbine generator driving controller according to the rotating speed set value, a measurement value of the rotating speed sensor, a measurement value of the lower current sensor, and the correction amount of the rotating speed controller so as to adjust the electromagnetic torque of the lower turbine generator.

In particular, the stabilized platform controller sends the measurement data $i_{q1}$ of the upper current sensor as the correction amount to the rotating speed controller. A specific condition is as follows:

$$\begin{cases} \tilde{V}^* = V^* \\ \tilde{\varphi} = \varphi^* \\ \tilde{i}_{q2}^* = i_{q2}^* - i_{q1} \end{cases}.$$

A proportional-integral-differential (PID) control method, a model-based active-disturbance-rejection control method or a feedback linearization method, etc. is employed for the design of the rotating speed controller, and the set value $i^*_{q2}$ of the lower current controller is obtained. The rotating speed controller obtains the set value $\tilde{i}^*_{q2}$ of the lower current controller by combining the correction amount given by the stabilized platform controller.

Figure 12:
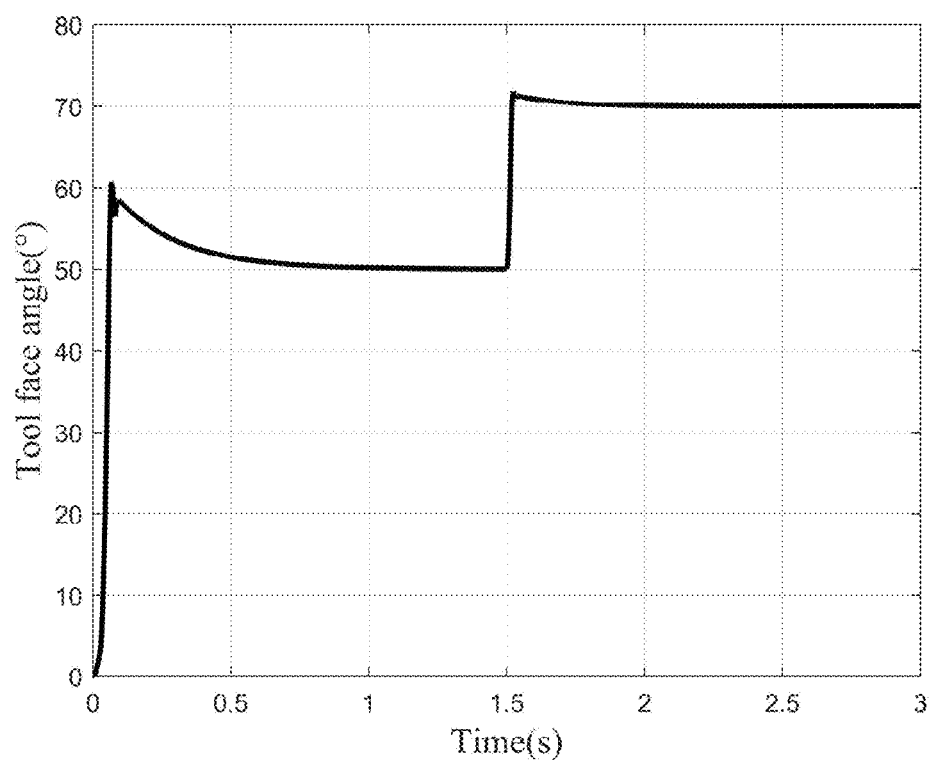
FIG. 12 shows a control effect of a tool face angle in a particular example of the present invention.
Figure 13:
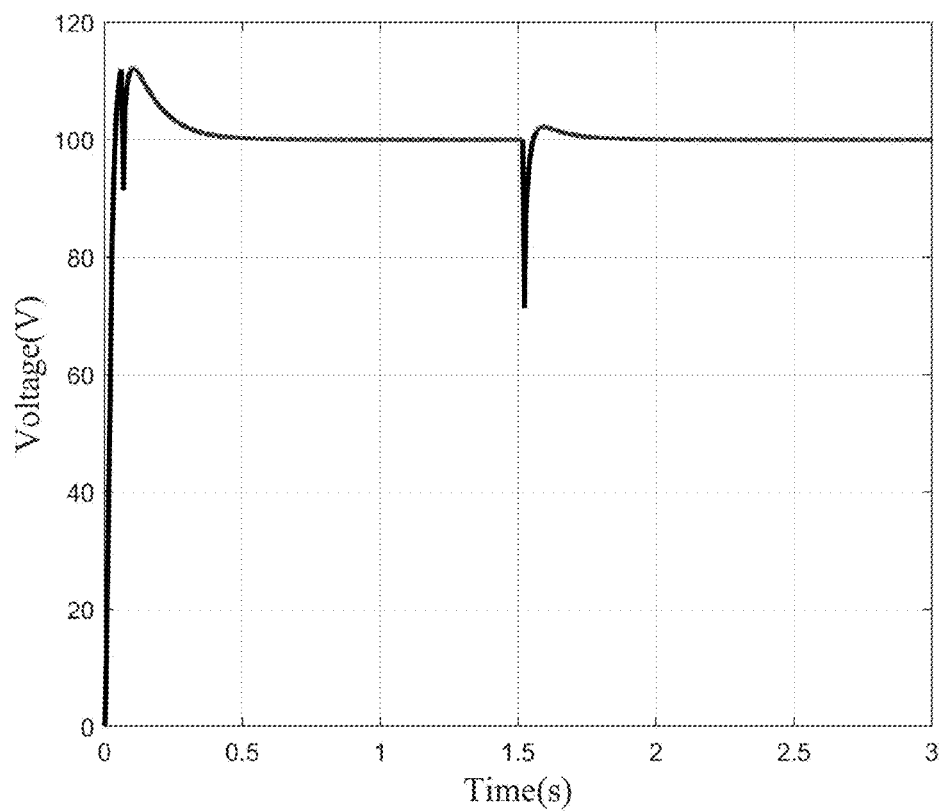
FIG. 13 is a control effect of a bus voltage in a particular example of the present invention.

The above main controller design method is employed to control the tool face angle of the stabilized platform. When an initial set value φ* of the tool face angle is set to 50°, and the set value is increased to 70° at 1.5 s, an anti-interference effect of the controller is shown in FIG. 12 and FIG. 13. When interference torque is added to the stabilized platform at 1.5 s, stress on the stabilized platform changes, and the direct current bus voltage returns to an initial set value quickly after a brief fluctuation. The tool face angle may track the change of the set value, overcome influence of torque disturbance, and keep the tool face angle stable at the set value. After the interference is added, the final voltage control accuracy of the controller is 6×10⁻³ V, and the tool face angle control accuracy is 2×10⁻³°, which may achieve better control performance.

The above examples are used for explaining the present invention, not to limit the present invention, and any modification and change made to the present invention within the spirit of the present invention and the protection scope of the claims fall within the protection scope of the present invention.

What is claimed is:

1. A ground testing device for a stabilized platform of a rotary steerable drilling tool, comprising a drill collar assembly, wherein the drill collar assembly comprises a drill collar and a drill collar motor, and a stabilized platform mounting assembly is arranged inside the drill collar for mounting the stabilized platform; the ground testing device further comprises:
   a first supporting member, wherein the drill collar motor is mounted outside the first supporting member, and a motor shaft of the drill collar motor penetrates the first supporting member and is connected to the drill collar;
   a second supporting member arranged opposite the first supporting member and provided with a first mounting hole; and
   a vibration mechanism comprising a first vibration member connected to the drill collar and a second vibration member arranged in the first mounting hole in a sleeved manner, wherein an elastic member is arranged between the second vibration member and the second supporting member, the elastic member is arranged on the second vibration member in a sleeving manner, an end portion of the first vibration member is provided with first vibration teeth, an end portion of the second vibration member is provided with second vibration teeth matching the first vibration teeth, in a rotation process of the drill collar, the second vibration teeth are separated from the first vibration teeth and meshed with the first vibration teeth under an action of the elastic member, so as to automatically open and close to generate vibration, and the second vibration member is provided with a first stop member which matches a second stop member arranged in the first mounting hole, so as to prevent the second vibration member from rotating around an axis of the drill collar when moving in an axial direction of the drill collar.

2. The ground testing device for a stabilized platform of a rotary steerable drilling tool according to claim 1, further comprising an interference loading assembly, wherein the interference loading assembly comprises a pressurizing member mounted on a side wall of the drill collar and a friction member mounted on the stabilized platform, one end of the pressurizing member is in close contact with the friction member to generate interference torque, and the pressurizing member is in threaded connection to the drill collar and moves in a radial direction of the drill collar during rotation.

3. The ground testing device for a stabilized platform of a rotary steerable drilling tool according to claim 1, wherein the stabilized platform mounting assembly comprises a first mounting member, a stabilized platform main body is mounted inside the first mounting member, and a side wall of the first mounting member is provided with a heating device so as to simulate a downhole high-temperature environment.

4. The ground testing device for a stabilized platform of a rotary steerable drilling tool according to claim 3, wherein the stabilized platform mounting assembly further comprises a second mounting member, a third mounting member, and a fourth mounting member that are separately and detachably connected to an end portion of the first mounting member, the second mounting member is provided with a first through hole, and the third mounting member is provided with a second through hole;
   when a single-motor stabilized platform is tested, the second mounting member or the third mounting member is mounted at one end of the first mounting member, and the fourth mounting member is mounted at the other end of the first mounting member; a single-motor stabilized platform driving motor is arranged on the side, far away from the first mounting member, of the second mounting member or the third mounting member, and a motor shaft of the single-motor stabilized platform driving motor penetrates the first through hole or the second through hole and is connected to the single-motor stabilized platform;

when a double-turbine generator stabilized platform is tested, the second mounting member is arranged at one end of the first mounting member, and the third mounting member is arranged at the other end of the first mounting member; an upper turbine generator rotor driving motor is arranged on the side, far away from the first mounting member, of the second mounting member, and a motor shaft of the upper turbine generator rotor driving motor penetrates the first through hole and is connected to an upper turbine generator so as to drive the upper turbine generator; and a lower turbine generator rotor driving motor is arranged on the side, far away from the first mounting member, of the third mounting member, and a motor shaft of the lower turbine generator rotor driving motor penetrates the second through hole and is connected to a lower turbine generator so as to drive the lower turbine generator.

5. The ground testing device for a stabilized platform of a rotary steerable drilling tool according to claim 4, further comprising a control unit, wherein the control unit comprises a main controller, a driving controller and a measurement unit, the driving controller comprises an upper turbine generator driving controller for driving the upper turbine generator to rotate and a lower turbine generator driving controller for driving the lower turbine generator to rotate, the measurement unit comprises an upper current sensor for measuring a current of the upper turbine generator, a lower current sensor for measuring a current of the lower turbine generator, a tool face angle measurement unit for measuring a tool face angle, a voltage sensor for measuring a bus voltage, and a rotating speed sensor for measuring a rotating speed of the lower turbine generator, and the main controller provides current set values for the upper turbine generator driving controller and the lower turbine generator driving controller respectively according to measurement data of the upper current sensor, measurement data of the lower current sensor, measurement data of the voltage sensor, measurement data of the rotating speed sensor, measurement data of the tool face angle measurement unit, a tool face angle set value, a direct current bus voltage set value and external working condition information so as to adjust electromagnetic torque of the upper turbine generator and the lower turbine generator.

6. The ground testing device for a stabilized platform of a rotary steerable drilling tool according to claim 5, wherein the main controller comprises:

a stabilized platform controller configured to: receive the direct current bus voltage set value V* and the tool face angle set value φ*, dynamically adjust a set value $\tilde{V}^*$ of a bus voltage controller and a set value $\tilde{\varphi}^*$ of a tool face angle controller according to the external working condition information, the measurement data of the upper current sensor, the measurement data of the lower current sensor, the measurement data of the voltage sensor, the measurement data of the rotating speed sensor and the measurement data of the tool face angle measurement unit, and provide a correction amount $\tilde{\omega}$ to a rotating speed controller to correct the rotating speed controller;

the bus voltage controller configured to: dynamically adjust the current set value of the upper turbine generator driving controller according to the set value $\tilde{V}^*$ and the measurement data of the voltage sensor so as to adjust the electromagnetic torque of the upper turbine generator;

the tool face angle controller configured to: dynamically adjust the set value of the rotating speed controller according to $\tilde{\varphi}^*$ and a tool face angle measurement value obtained by means of the tool face angle measurement unit; and the rotating speed controller configured to: dynamically adjust the current set value of the lower turbine generator driving controller according to the rotating speed set value, a measurement value of the rotating speed sensor, a measurement value of the lower current sensor, and the correction amount of the rotating speed controller so as to adjust the electromagnetic torque of the lower turbine generator.

7. The ground testing device for a stabilized platform of a rotary steerable drilling tool according to claim 6, wherein the upper turbine generator driving controller comprises an upper current controller and an upper inverter circuit, and the upper inverter circuit is connected to the upper turbine generator; and the upper current controller is configured to: receive the current set value of the upper turbine generator driving controller given by the bus voltage controller, and dynamically adjust a conduction state of the upper inverter circuit according to the measurement data of the upper current sensor so as to adjust the electromagnetic torque of the upper turbine generator.

8. The ground testing device for a stabilized platform of a rotary steerable drilling tool according to claim 6, wherein the lower turbine generator driving controller comprises a lower current controller and a lower inverter circuit, and the lower inverter circuit is connected to the lower turbine generator; and the lower current controller is configured to: receive the current set value of the lower turbine generator driving controller given by the rotating speed controller, and dynamically adjust a conduction state of the lower inverter circuit according to the measurement data of the lower current sensor so as to adjust the electromagnetic torque of the lower turbine generator.

9. The ground testing device for a stabilized platform of a rotary steerable drilling tool according to claim 5, wherein the main controller comprises:

the stabilized platform controller configured to: directly send the received direct current bus voltage set value V* to the bus voltage controller, directly send the received tool face angle set value φ* to the tool face angle controller, and send the measurement data of the upper current sensor to the rotating speed controller as a correction amount;

the bus voltage controller configured to: dynamically adjust the current set value of the upper turbine generator driving controller according to the set value V* and the measurement data of the voltage sensor so as to adjust the electromagnetic torque of the upper turbine generator;

the tool face angle controller configured to: dynamically adjust the set value of the rotating speed controller according to φ* and the tool face angle measurement value obtained by means of the tool face angle measurement unit; and the rotating speed controller configured to: dynamically adjust the current set value of the lower turbine generator driving controller according to the rotating speed set value, a measurement value of the rotating speed sensor, a measurement value of the lower current sensor, and the correction amount of the rotating speed controller so as to adjust the electromagnetic torque of the lower turbine generator.

* * * * *